US012366503B2

(12) United States Patent
Qi

(10) Patent No.: US 12,366,503 B2
(45) Date of Patent: Jul. 22, 2025

(54) EYEGLASSES LENS EVALUATION DEVICE

(71) Applicant: HOYA LENS THAILAND LTD., Pathumthani (TH)

(72) Inventor: Hua Qi, Tokyo (JP)

(73) Assignee: HOYA LENS THAILAND LTD., Pathumthani (TH)

(*) Notice: Subject to any disclaimer, the term of this patent is extended or adjusted under 35 U.S.C. 154(b) by 187 days.

(21) Appl. No.: 17/912,678

(22) PCT Filed: Mar. 17, 2021

(86) PCT No.: PCT/JP2021/010715
§ 371 (c)(1),
(2) Date: Sep. 19, 2022

(87) PCT Pub. No.: WO2021/200133
PCT Pub. Date: Oct. 7, 2021

(65) Prior Publication Data
US 2023/0152182 A1    May 18, 2023

(30) Foreign Application Priority Data
Mar. 31, 2020    (JP) ................................ 2020-063166

(51) Int. Cl.
*G01M 11/02*    (2006.01)
(52) U.S. Cl.
CPC .............................. *G01M 11/0264* (2013.01)
(58) Field of Classification Search
CPC ......... G01M 11/0264; G01M 11/0242; G01M 11/0257; G01M 11/02; G02C 7/061;
(Continued)

(56) References Cited

U.S. PATENT DOCUMENTS 10,365,716 B2 * 7/2019 Aimone ................. G02C 11/10
2002/0041358 A1    4/2002 Qi
(Continued)

FOREIGN PATENT DOCUMENTS

CN    114930227 A * 8/2022 ........... G02C 13/003
EP    1446694 B1 * 8/2018 ........... G02C 13/003
(Continued)

OTHER PUBLICATIONS

Jun. 15, 2021 Search Report issued in International Patent Application No. PCT/JP2021/010715.
(Continued)

*Primary Examiner* — Mohamed K Amara
(74) *Attorney, Agent, or Firm* — Oliff PLC

(57) ABSTRACT

An eyeglasses lens evaluation device includes a fixation point setting part to set a fixation point on an evaluation target space and set a line of sight passing position on eyeglasses lenses when a wearer wears the eyeglasses lenses and looks at the fixation point, an apparent position calculating part to calculate an apparent position of each of a plurality of evaluation points set on the evaluation target space in a state where the wearer wears the eyeglasses lenses and fixates the wearer's eyes on the fixation point via the line of sight passing positions, a difference calculating part to calculate, for each of the plurality of evaluation points, a difference between the apparent position and a reference position, and an evaluation index calculating part to calculate an evaluation index by taking statics of the difference for each of the plurality of evaluation points calculated by difference calculating part.

7 Claims, 10 Drawing Sheets

(58) Field of Classification Search
CPC .......... G02C 7/027; G02C 7/025; G02C 7/02; G02C 2202/06; G02C 13/003; G06F 3/013; G06F 3/0346; G06F 30/20; G06F 3/011; G06F 3/017; G06V 40/161; G06V 10/141; G06V 20/597; G06V 40/18; A61B 3/113; A61B 3/0041; A61B 3/032; A61B 3/0008; A61B 3/0025; A61B 3/152; A61B 5/163; G02B 27/0093; G02B 27/0172

See application file for complete search history.

(56) References Cited

U.S. PATENT DOCUMENTS

| | | | |
|---|---|---|---|
| 2003/0038921 A1* | 2/2003 | Neal | G01M 11/0264 351/212 |
| 2003/0076479 A1 | 4/2003 | Qi | |
| 2008/0106697 A1* | 5/2008 | Pedrono | G02C 7/061 351/159.42 |
| 2009/0290121 A1* | 11/2009 | Drobe | G02C 7/066 351/159.42 |
| 2012/0081661 A1* | 4/2012 | Yamakaji | G02C 7/061 351/159.01 |
| 2012/0105609 A1* | 5/2012 | Qi | A61B 3/08 348/54 |
| 2012/0105801 A1 | 5/2012 | Yamakaji | |
| 2013/0044291 A1* | 2/2013 | Kato | A61B 3/0025 351/209 |
| 2013/0179297 A1* | 7/2013 | Yamakaji | G02C 7/027 351/159.01 |
| 2014/0139647 A1* | 5/2014 | Nagatani | H04N 13/373 348/51 |
| 2015/0103312 A1 | 4/2015 | Paille et al. | |
| 2015/0146164 A1 | 5/2015 | Contet et al. | |
| 2016/0198942 A1* | 7/2016 | Dai | G02C 7/025 623/6.11 |
| 2018/0143452 A1 | 5/2018 | Allione et al. | |
| 2018/0299694 A1 | 10/2018 | Rousseau et al. | |
| 2018/0299696 A1 | 10/2018 | Heslouis et al. | |
| 2020/0033632 A1* | 1/2020 | Robinson | G02C 7/028 |
| 2020/0241320 A1 | 7/2020 | Bercher et al. | |
| 2021/0271108 A1 | 9/2021 | Kozu | |

FOREIGN PATENT DOCUMENTS

| | | |
|---|---|---|
| JP | 2002-107679 A | 4/2002 |
| JP | 2003-177076 A | 6/2003 |
| JP | 3919069 B2 | 5/2007 |
| JP | 3919097 B2 | 5/2007 |
| JP | 4301399 B2 | 7/2009 |
| JP | 4481093 B2 | 6/2010 |
| JP | 2015-94917 A | 5/2015 |
| JP | 2018-109785 A | 7/2018 |
| JP | 2018-530787 A | 10/2018 |
| WO | 2010/087450 A1 | 8/2010 |
| WO | 2019/068586 A1 | 4/2019 |
| WO | 2020/004620 A1 | 1/2020 |

OTHER PUBLICATIONS

Apr. 22, 2024 Notice of Reasons of Refusal issued in Japanse Patent Application No. 2020-063166.
Apr. 12, 2024 Extended Search Report issued in European Patent Application No. 21780335.2.

* cited by examiner

EYEGLASSES LENS EVALUATION DEVICE

TECHNICAL FIELD

The present disclosures relate to an eyeglasses lens evaluation device.

BACKGROUND

There is known technology for evaluating an eyeglasses lens by rotating an eyeball toward respective evaluation points and determining appearance (e.g., distortion of an image of an evaluation point captured by a central fovea) when the eye is fixedly looking at the evaluation point through the eyeglasses lens (for example, Japanese Patent No. 4481093). The retina has remarkably high visual acuity at the central fovea. Therefore, by evaluating the eyeglasses lens based on the image distortion, etc. captured in the central fovea, appropriate evaluation results of the eyeglasses lens can be obtained.

SUMMARY OF INVENTION

However, some eyeglasses lens wearers may feel uncomfortable with image distortion, etc., captured at the periphery of the retina outside the central fovea (in other words, image distortion at the periphery of the visual field, and the like). When a person views an object with both eyes, he or she perceives the distance from the object based on the difference in the position of the images produced on the retinas of the left and right eyes (i.e., disparity). When there is a distortion of the image on the retinal periphery, the person not only sees objects in a distorted state, but may also perceives that the object is at a different distance from the true distance.

The present invention was made in view of the above circumstances, and the purpose of the present invention is to provide an eyeglasses lens evaluation device configured to evaluate an eyeglass lens with taking into account an image captured at not only the central fovea but also the periphery of the retina outside the central fovea.

According to aspects of the present disclosure, there is provided an eyeglasses lens evaluation device, including a fixation point setting part configured to set a particular position on an evaluation target space as a fixation point, and when a wearer wears a pair of right and left eyeglasses lenses and is looking at the fixation point and fixes wearer's eyes, set a line of sight passing position, of the wearer, on each of the pair of right and left eyeglasses lenses, respectively, an apparent position calculating part configured to calculate an apparent position of each of a plurality of evaluation points set on the evaluation target space in a state where the wearer wears the pair of right and left eyeglasses lenses and fixates the wearer's eyes on the fixation point via the line of sight passing positions, a difference calculating part configured to calculate, for each of the plurality of evaluation points, a difference between the calculated apparent position and a reference position of each of the plurality of evaluation points, and an evaluation index calculating part configured to calculate an evaluation index by taking statics of the calculated difference for each of the plurality of evaluation points.

According to aspects of the present disclosure, the evaluation index calculating part may be configured to calculate the evaluation index using a following equation:

$$DI = \sqrt{\frac{1}{n}\sum_{i=1}^{n}\Delta_i^2}$$

where, DI is the evaluation index, n is a number of samples of the plurality of evaluation points set in the evaluation target space, and $\Delta i$ is the difference between the apparent position and the reference position of each of the plurality of evaluation point.

According to aspects of the present disclosure, the difference between the apparent position and the reference position of each of the plurality of evaluation point may be calculated according to a following equation:

$$\Delta_i = D_i - D_{i0}$$

where, $D_i$ is an inverse of a distance for each evaluation point from the apparent position to a midpoint of both eyes of the wearer, and $D_{i0}$ is an inverse of a distance from the reference position to the midpoint of both eyes of the wearer.

According to aspects of the present disclosure, the difference between the apparent position and the reference position of each of the plurality of evaluation point may be calculated according to a following equation:

$$\Delta_i = |\sin \alpha_i|$$

where, $\alpha_i$ is an angle between a vector from the apparent position to a midpoint of both eyes of the wearer at each of the plurality of evaluation points and a vector from the reference position to the midpoint of both eyes of the wearer at each of the plurality of evaluation points.

According to aspects of the present disclosure, the reference position may be a position of each of the plurality of evaluation points set on the evaluation target space.

According to aspects of the present disclosure, when the pair of right and left eyeglasses lenses are lenses other than single focus lenses, the reference position is an apparent position when the wearer wears the single focus lenses which have the same power as the pair of right and left eyeglasses lenses.

According to aspects of the present disclosure, an eyeglasses lens evaluation device can evaluate an eyeglass lens with taking into account an image captured at not only the central fovea but also the periphery of the retina outside the central fovea.

BRIEF DESCRIPTION OF THE ACCOMPANYING DRAWINGS

Figure 10:
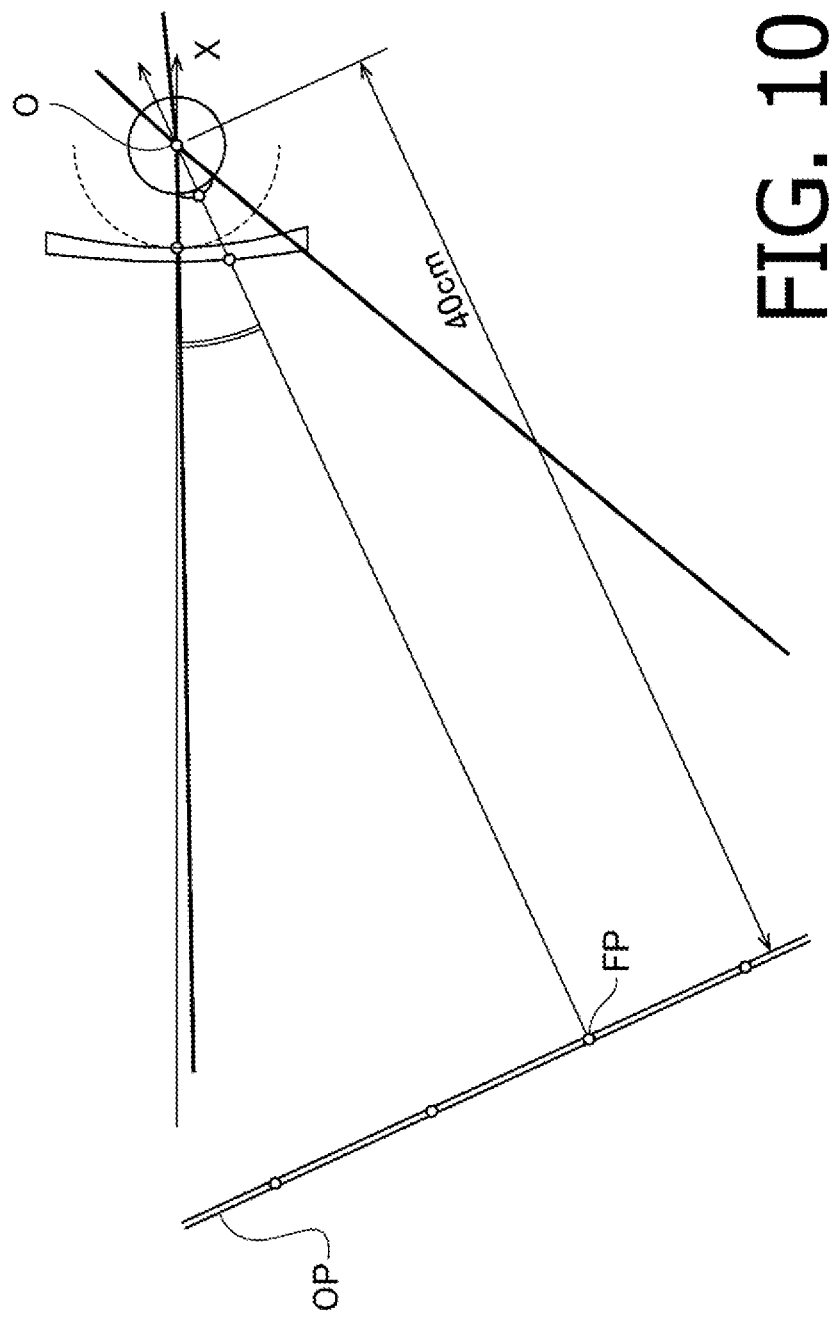

FIG. 10 schematically shows an example of an arrangement of planes within the evaluation area according to a second embodiment.

Figure 11:
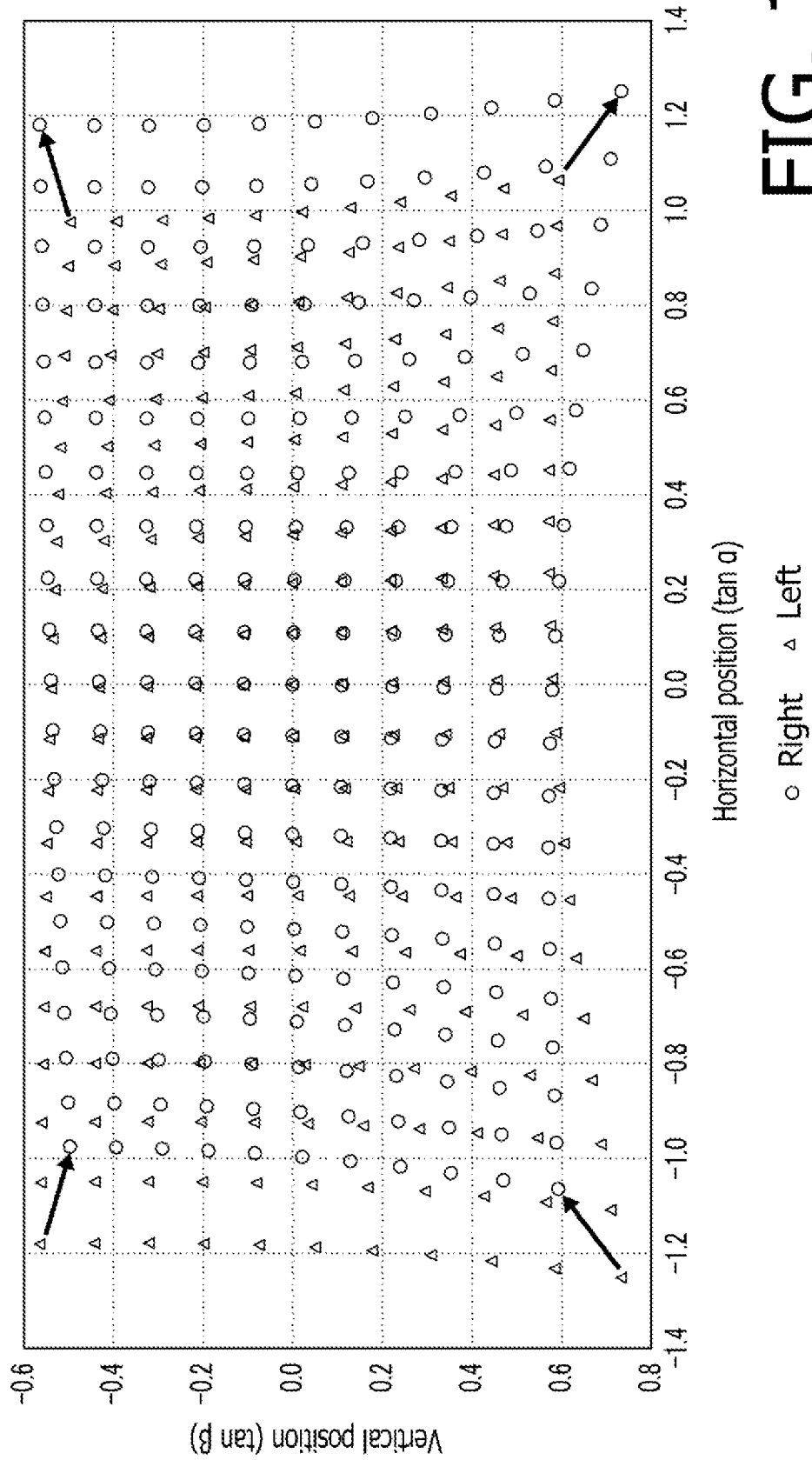

FIG. 11 shows the parallax between the right and left eyes when the wearer is looking at a plane in the evaluation area that is placed obliquely downward while wearing the eyeglasses lenses in accordance with the second embodiment.

DETAILED DESCRIPTION OF THE EMBODIMENTS

Hereinafter, referring to the drawings, an evaluation device for an eyeglasses lens according to an embodiment and a method of evaluating the eyeglasses lens performed in the evaluation device.

Figure 1:
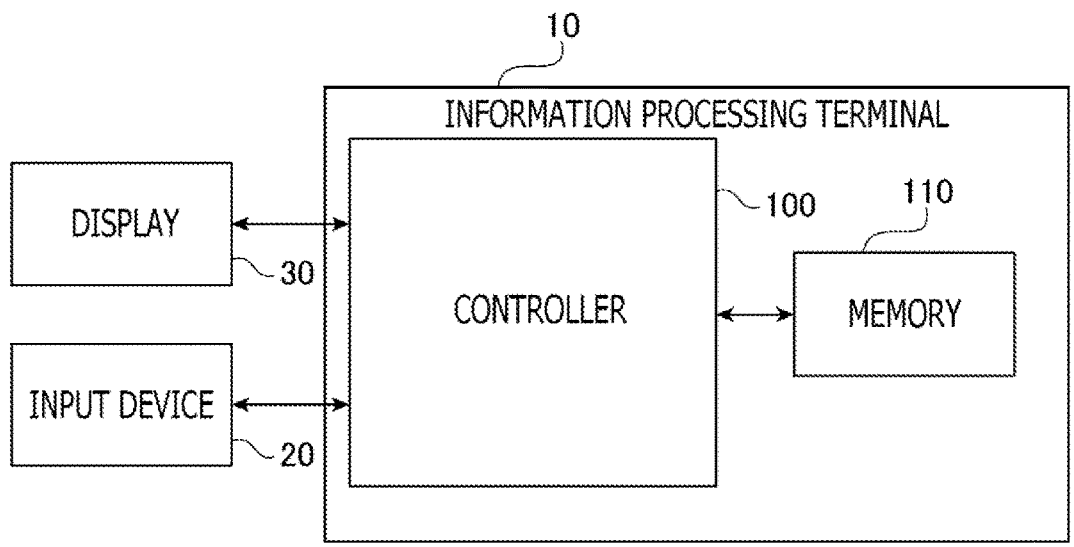
FIG. 1 is a block diagram showing a schematic configuration of an eyeglasses lens evaluation device according to an embodiment of the present disclosures.

FIG. 1 is a block diagram illustrating a schematic configuration of an evaluation system 1 according to a first embodiment. The evaluation system 1 is a system for evaluating the eyeglasses lens. The evaluation system 1 includes, as shown in FIG. 1, an information processing terminal 10, an input device 20 and a display 30.

The information processing terminal 10 is an example of an evaluation device. In the present embodiment, the information processing terminal 10 is, for example, a desktop PC (personal computer).

According to the present embodiment, the input device 20 includes, for example, a mouse and a keyboard, and the display 30 includes, for example, a display device such as an LCD device or the like. The input device 20 and the display 30 are connected to the information processing terminal 10 in a wired or a wireless manner.

In the present embodiment, the information processing terminal 10, the input device 20 and the display 30 are separate devices. However, in another embodiment, the above devices may be integrated in one device. An example of such an integrated type device includes a PC (personal computer), a tablet terminal, a smartphone and the like, which has functions of the information processing terminal 10, the input device 20, and the display 30. In such a case, the evaluation system 1 is configured by a single device (e.g., a single note PC, a single tablet terminal, a single smartphone, and the like). According to such an integrated type, the evaluation system can be carried easily.

The information processing terminal 10 is provided with a controller 100 and a memory 110.

The controller 100 is, for example, a system LSI (Large-scale Integrated Circuit) provided with a CPU (Central Processing Unit) and a DSP (digital signal processor). The memory 110 includes an HDD (hard disk drive), a RAM (random access memory), and a ROM (read only memory). The controller 100 is configured to call a program stored in the HDD or the ROM, and executes the called program with the DSP or the CPU, thereby performing various control processes. In the HDD, the ROM and/or the RAM, control parameters necessary for executing the program are also stored.

Figure 2:
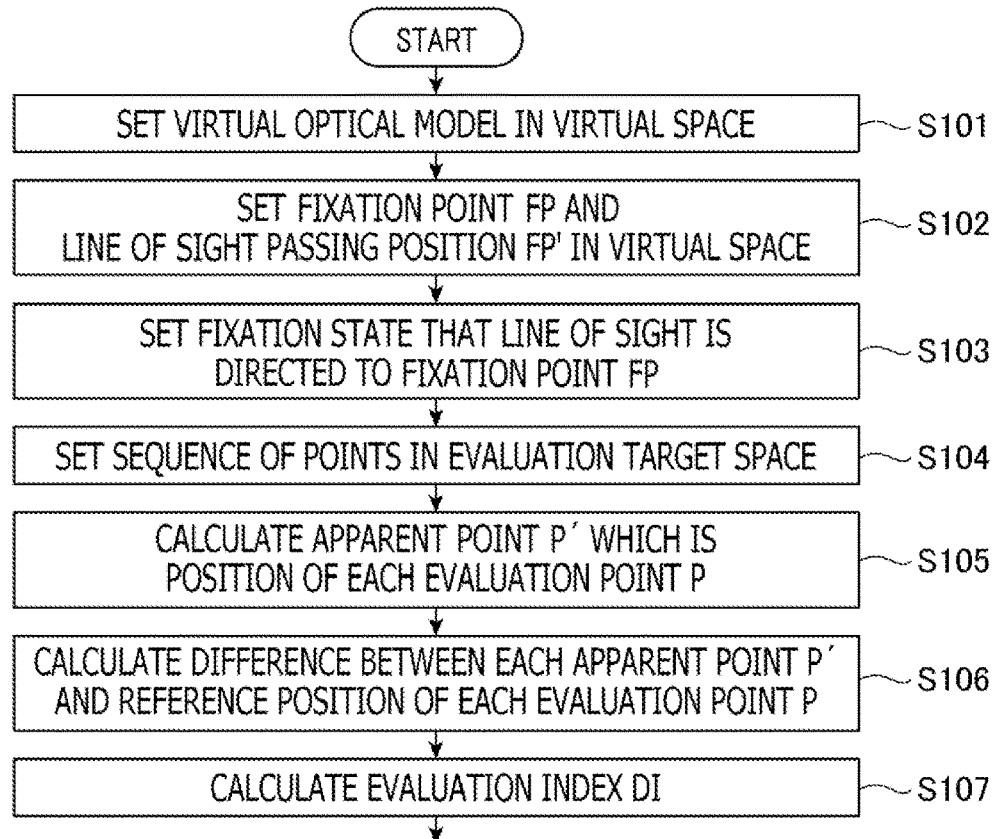
FIG. 2 is a flowchart illustrating an evaluation process of an eyeglasses lens.

One of the programs stored in the HDD or the ROM is an evaluation program for evaluating the eyeglasses lens. FIG. 2 shows a flowchart illustrating an evaluation process (evaluation method) of the eyeglasses lens which is performed as the CPU executes the evaluation program.

As shown in FIG. 2, the controller 100 sets a virtual optical model for evaluating the eyeglasses lens which is evaluation target eyeglasses lens subjected to an evaluation in a virtual space (S101). The evaluation target eyeglasses lens may be, for example, an eyeglasses lens of a basic specification set by an eyeglasses lens maker, or an eyeglasses lens planned to be sold for patients.

In the present embodiment, in order to facilitate understanding of the invention, a case in which the controller 100 sets each element (e.g., a plane OP and the like which will be described later) in the virtual space, and based on each element as set, an evaluation result (i.e., an evaluation index DI) of the eyeglasses lens is calculated will be described. It is noted, however, a calculation method of the evaluation result using the virtual space is not mandatory. As an alternative, the controller 100 may simply keep each element as numerical data and perform ray tracing using these numerical data or calculations using mathematical formulas (details will be described later) to obtain evaluation results.

When the evaluation target is an eyeglasses lens to be sold to a patient, for example, an eyeglasses lens model L is set based on patient's prescription data received via a network from an eyeglasses retailer's terminal. This prescription data includes, as an example, optometry results at an optician (e.g., prescription value data of spherical refractive power, astigmatic refractive power, astigmatic axis direction, prismatic refractive power, prismatic base direction, addition power, distance PD (Pupillary Distance), near PD, or the like), layout data (e.g., eye point position, forward tilting angle, swing angle, distance between vertices, distance between pupils, and the like), frame data (e.g., frame tracer measurement results, data indicating a frame type (frame shape), data indicating frame part number, and the like), and a type of eyeglasses lens (e.g., single focal spherical lens, single focal aspheric lens, lens for fatigue reduction, exclusive short-sighted lens, progressive power lens). If the type of eyeglasses lens is the progressive power lens, the prescription data may further include a design type (e.g., a type with a wide myopic clear vision, a type with a wide hyperopic clear vision, and the like). Since the method of setting the eyeglasses lens model L based on such prescription data is well known, a concrete explanation is omitted.

Figure 3:
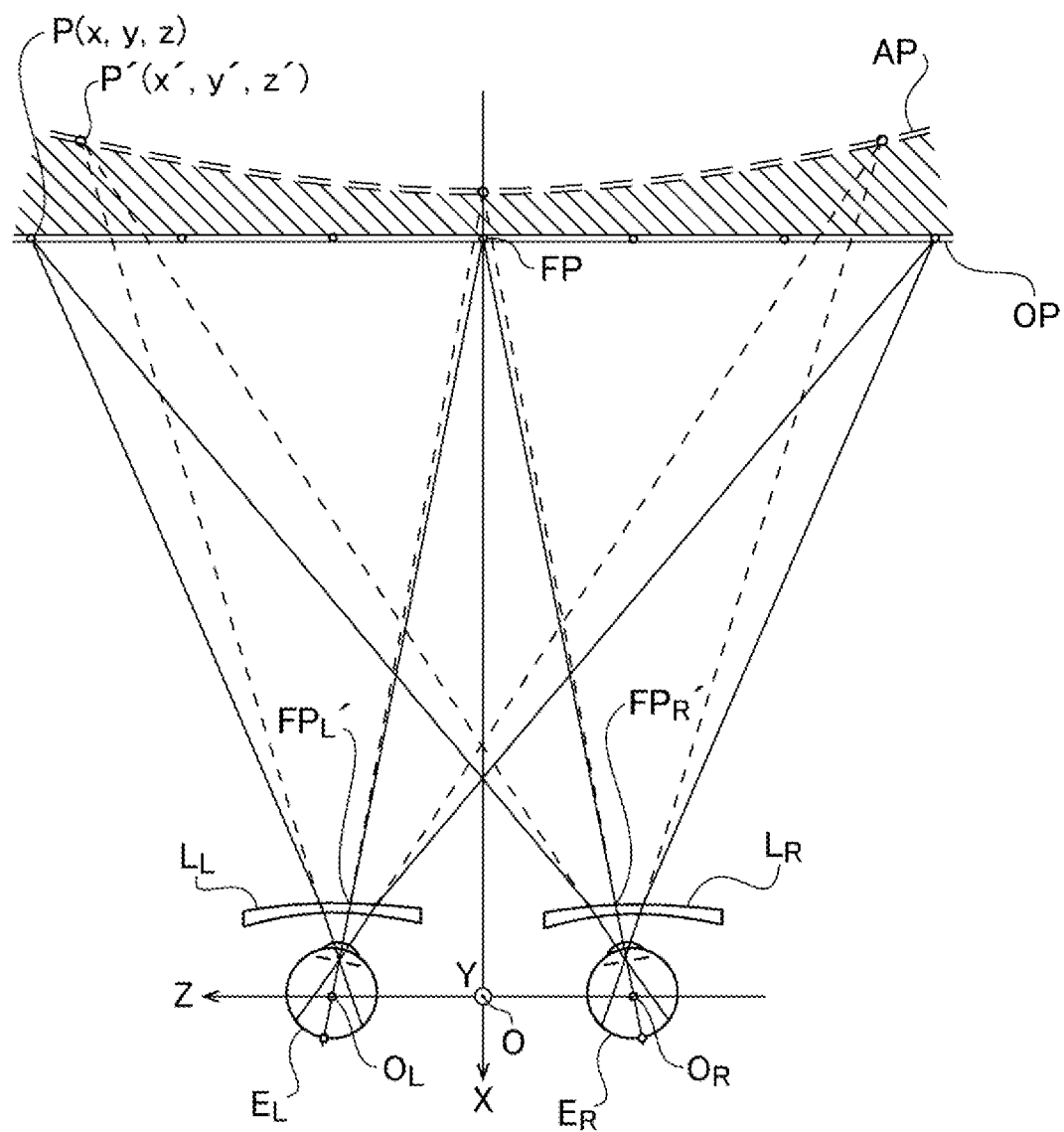
FIG. 3 shows an example of a virtual optical model set up in a virtual space according to an embodiment.

FIG. 3 shows an example of a virtual optical model set in the virtual space in S101. As shown in FIG. 3, the virtual optical model includes an eyeglasses lens model indicating evaluation target lenses (more specifically, a pair of right and left eyeglasses lenses $L_R$ and $L_L$), and an eyeball model E (more specifically, a pair of right and left eyeball models $E_R$ and $E_L$).

In this description, an element corresponding to the right eye is marked with a subscript "R" and an element corresponding to the left eye is marked with a subscript "L." Further, when both the right and left elements are collectively referred to, the element should be written without a subscript. Taking the eyeglasses lens model as an example, the eyeglasses lens model for the left eye is indicated as "eyeglasses lens model $L_L$," the eyeglasses lens model for the right eye is indicated as "eyeglasses lens model $L_R$," and the collective term for these eyeglasses lens models $L_L$ and $L_R$ is "eyeglasses lens model L.

In the example shown in FIG. 3, the coordinate system of the virtual space is the XYZ orthogonal coordinate system. The X, Y and Z axes intersect orthogonally to each other at a midpoint between a center $O_L$ of the eyeglasses lens model $L_L$ and a center $O_R$ of the eyeglasses lens model $L_R$ (hereinafter referred to as the "midpoint O of both eyes"). It is noted that the Z axis is an axis parallel to a plane of FIG. 3. On the Z axis, the center $O_R$ and the midpoint O of both eyes, and the center $O_L$ are aligned. The X axis is an axis parallel to a plane of FIG. 3 and orthogonally intersects with the Z axis. The Y axis is an axis extending orthogonally to a plane of FIG. 3, and intersects with the X axis and the Z axis.

The eyeball model may be a well-known model such as Gullstrand's model eye. Further, the eyeball model is not necessarily limited to a complex model with all the tissues that form the eyeball but may be a simple model with, for example, only the main eye elements (e.g., cornea and lens) and retina.

The position and angle (this angle assumes, for example, an angle relative to the patient's frontal parallel plane) of the eyeglasses lens model L relative to the eyeball model E is determined based on, for example, layout data. If no layout data is available, the specified position and angle are applied.

For example, the shape of the eyeglasses lens model L is set to the lens shape after framing (i.e., cut lens shape) based on frame data. If no layout data is available, the lens shape is set to the specified lens shape. The shape of the eyeglasses lens model L may be an uncut lens shape instead of a cut lens shape.

The controller 100 sets a fixation point FP in the virtual space (step S102). The controller 100 uses ray tracing to calculate the line of sight passing position FP' on the eyeglasses lens (the eye line passing positions $FP_L$' on the eyeglasses lens model $L_L$ and the eye line posing position $FP_R$' on the eyeglasses lens model $L_R$) when wearing the eyeglasses lenses and looking at the fixation point FP, and set the calculation result to the virtual space.

The controller 100 rotates each of the eyeball models $E_L$ and $E_R$ to set a fixation state in which the line of sight is directed to the fixation point FP via the line of sight passing positions $FP_L$' and the eyeglasses lens model $L_R$, in the virtual space (step S103).

As described above, the controller 100 serves as a fixation point setting part to set a particular position on the evaluation target space as the fixation point FP and sets the line of sight passing positions FP' on the lens when the wearer wears the pair of right and left eyeglasses lenses and is looking at the fixation point FP and fixes his/her eyes.

The controller 100 sets (arranges) a plurality of evaluation points P (a sequence of points) in the evaluation target space (step S104). The sequence of points varies depending on how the evaluation target is set. For example, when evaluating the three-dimensional distortion of an entire space, a sequence of points is set so that the evaluation points P are distributed uniformly within the evaluation target space (i.e., the evaluation points P are equally or unequally spaced in each direction of XYZ over the entire space). Alternatively, the sequence of points may be set such that the evaluation points P are distributed uniformly on a plane at a finite distance in front of the eyes, assuming a situation where the wearer is looking at a newspaper or the like.

The controller 100 calculates the apparent position, which is a position of each of the plurality of evaluation points P set in S104, and is also the apparent position of each of the plurality of evaluation points P in the fixation state set in S102 and S103 (hereinafter, such positions will be referred to as apparent points P') (step S105). That is, in S105, the controller 100 serves as an apparent position calculating part configured to calculate the apparent position P' which is the apparent position of each of the evaluation points P set on a space, and is also the apparent position P' in a state where the wearer wears the pair of right and left glass lenses and is looking at the fixation point FP and fixes his/her eyes via the line of sight passing positions FP'. In this description, the apparent point P' may occasionally be referred to as apparent position P' or point P' on appearance.

The controller 100 calculates the difference between position of each apparent point P' calculated in S104 and the reference position of each evaluation point P (step S106), and further calculates an evaluation index DI which is obtained by taking statics of the difference of positions for each evaluation point (S107). That is, in S106, the controller 100 serves as a difference calculating part to calculate, for each of the plurality of evaluation points P, the difference between the apparent position P' calculated by the position calculating part and the reference position of the evaluation point P. Further, in S107, the controller 100 serves as an evaluation index calculating part to calculate, for each of the evaluation points calculated by the difference calculating part, the evaluation index by taking statics of the difference of the apparent position P' and the reference position of the evaluation point P.

The evaluation index DI is an index that evaluates changing of the visual field (e.g., distortion, correction effect, etc.) when the wearer wears the eyeglasses lenses to be evaluated and is looking at objects.

The reference position of each evaluation point P is a preset position where the evaluation point P should be. Concretely, the reference position of each evaluation point P is a position of each evaluation point P itself or an apparent position of each evaluation point P with respect to a certain situation. As an example, it is assumed that the evaluation area is a plane orthogonal to a line extending from a midpoint O of both eyeballs to a fixation point FP which is separated from the midpoint O by a particular distance, and the plane including the fixation point FP. In such a case, a position of the plane orthogonal to the line extending from the midpoint O of both eyeballs to the apparent fixation point FP, and including the apparent fixation point FP is set as the reference position of each evaluation point P. Alternatively, a position of the evaluation point P itself which is set within the plane of the evaluation area (i.e., an apparent position of the evaluation point P when naked eyes are looking at the fixation point FP and fixed) may be set as the reference position of the evaluation point P. Further alternatively, the apparent position of the evaluation point P, assuming that the wearer is wearing a single focus lens with the same power as the eyeglasses lens to be evaluated (e.g., a single focus lens with the same power as the far use power of the bifocal progressive power lens to be evaluated), may be set as the reference position of the evaluation point P.

The evaluation points P that are subject to statistical analysis (in other words, the range of the space to be evaluated) may be all the evaluation points P set up in the virtual space, or a part of the evaluation points P set in the virtual space. The part of the evaluation points P are, for example, evaluation points P that can be seen through a particular range on the eyeglasses lenses (e.g., the upper half, the lower half, the portion within a radius of 20 mm from the center, and the like), or an evaluation points P set within a particular distance range in the virtual space.

For example, when evaluating a near use portion of a bifocal progressive power lens, the fixation point FP is set at a distance of about 40 cm from the eyeglasses lens model L (more specifically, the midpoint O of both eyes). In this case, the line of sight passing position FP' on the eyeglasses lens is the near use area of the eyeglasses lens (as an example, when the progressive band length is 11 mm, the position is 11 mm below the geometric center of the lens). In other words, the left and right eyeballs rotate downward to fixate on the fixation point FP.

The evaluation points P are set on a plane that assumes, for example, the surface of a newspaper or book that the wearer reads, or the screen of a note PC or tablet terminal. In the following description, such a plane included in the evaluation area (exemplarily, a plane perpendicular to the line of sight of the fixation point FP) will be referred to as a plane OP. The evaluation points P are set in the plane OP in uniformly distributed manner (equally or unequally spaced in each direction of X and Y). For each evaluation point P, the position in a space that the eye perceives in the fixation state, i.e., the apparent position of the evaluation point P, or an apparent point P', is obtained. The plane containing each apparent point P' (hereinafter, referred to as an "apparent plane AP") indicates the apparent shape of the plane OP.

When the reference position of the evaluation point P is the position in the naked eye state (i.e., the position of the evaluation point P itself set in the space to be evaluated), the difference between the plane OP and the apparent plane AP, which represents the difference between the apparent point P' and the reference position of each evaluation point P, is conceptually indicated by the area of the hatched area in FIG. 3. Conceptually, in S106 of FIG. 2, the evaluation result is that the larger the area of this hatched area, the greater the change (e.g., distortion, corrective effect and the like) in the visual field when wearing eyeglasses lenses relative to the reference condition (in this case, naked eye condition).

Figure 4:
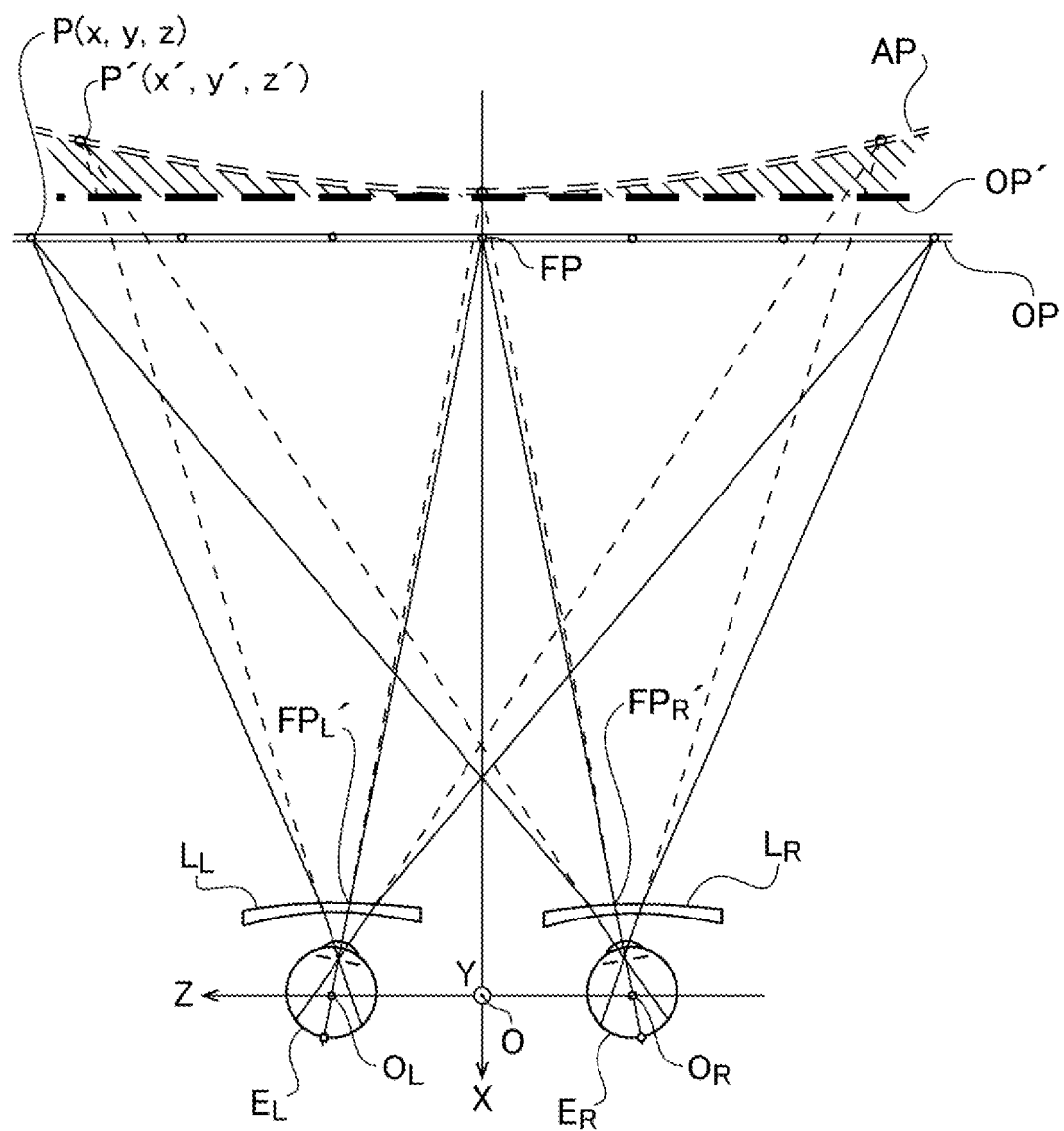
FIG. 4 shows an example of a virtual optical model set up in a virtual space according to an embodiment.

FIG. 4 shows an example of a virtual optical model similar to the model shown FIG. 3. FIG. 4 shows, in comparison with FIG. 3, a plane OF is added and an area between the plane OP' and the apparent plane AP is hatched. At the line of sight passing positions FP' on the eyeglasses lenses to be evaluated, the apparent positions of the fixation points FP are behind or in front of the position of the fixation points FP in the space due to a slight base-in or base-out prism effect. In the example in FIG. 4, it is considered that the plane OP' perpendicular to the line from the midpoint O of both eyes to the apparent positions of the fixation points FP, including the apparent positions of the fixation points FP, are the apparent plane as it should be. In this case, the change in the visual field when wearing eyeglasses lenses relative to the reference state (i.e., the evaluation result) can be conceptually considered as the area of the hatched area in FIG. 4.

Figure 5:
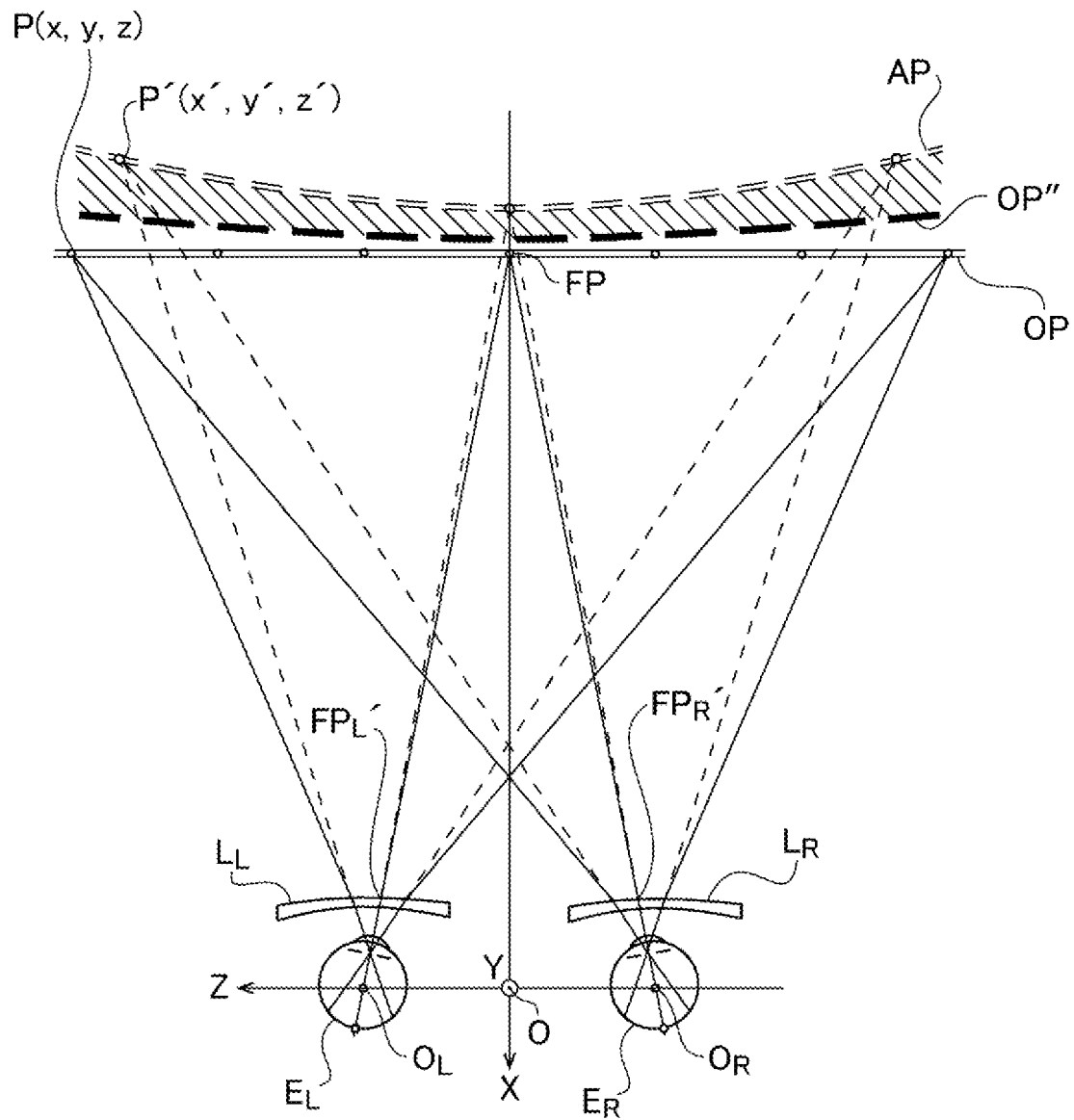
FIG. 5 shows an example of a virtual optical model set up in a virtual space according to an embodiment.

FIG. 5 shows an example of a virtual optical model similar to the one shown in FIG. 3. In FIG. 5, a curved plane OP''' is added to FIG. 3, and the area between the curved plane OP''' and the apparent plane AP is indicated by hatching. The curved plane OP''' is the apparent plane of the plane OP with the same prescription or fitting position of the single focus lenses eyeglasses instead of the eyeglasses lenses to be evaluated, and with the fixation points FP being viewed through the same position. When the eyeglasses lenses to be evaluated are lenses other than single focus lenses, for example, progressive power lenses, the reference position of each evaluation point P is set on the curved plane OP'''. In this case, the change in the visual field (evaluation result) when wearing eyeglasses lenses relative to the reference state can be conceptually considered to be the area of the hatched area in FIG. 5.

In step S104, the controller 100 can set the evaluation area (in other words, the space to be evaluated and also the position and size of the visual field) on the eyeglasses lens.

The visual field set here can be, for example, a circular plane of radius n1 (n1 being 300 mm as an example) centered on the fixation point FP in the aforementioned case (a case where evaluation is performed for the near use portion of a bifocal progressive power lens) or a rectangular plane (length n2×width n3: n2 being 400 mm and n3 being 800 mm as an example) centered on the fixation point FP.

When evaluating the entire eyeglasses lenses, the entire space of the visual field is set as the space to be evaluated, and each evaluation point P is set in this set space.

Figure 6:
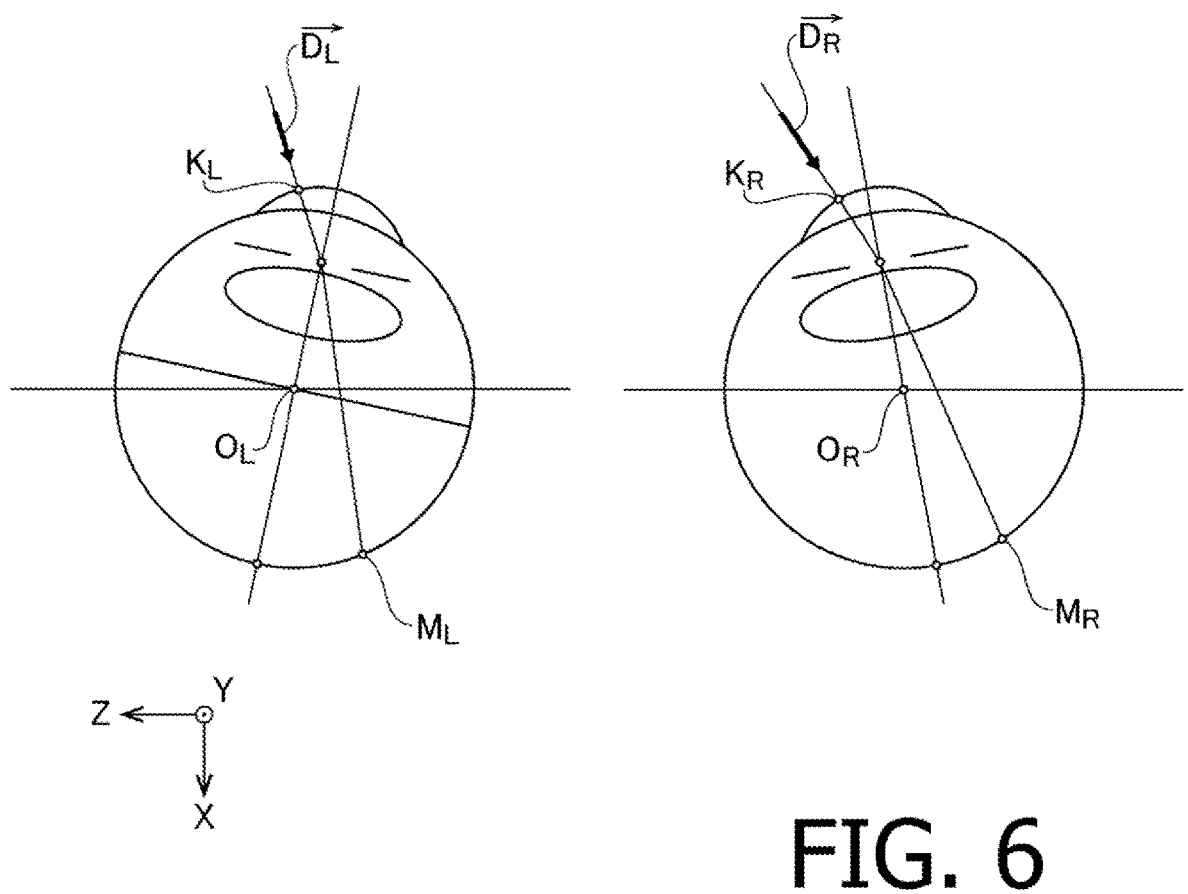
FIG. 6 shows an example of a method for calculating an apparent position, which is an apparent position of an evaluation point in the virtual space according to the embodiment.
Figure 7:
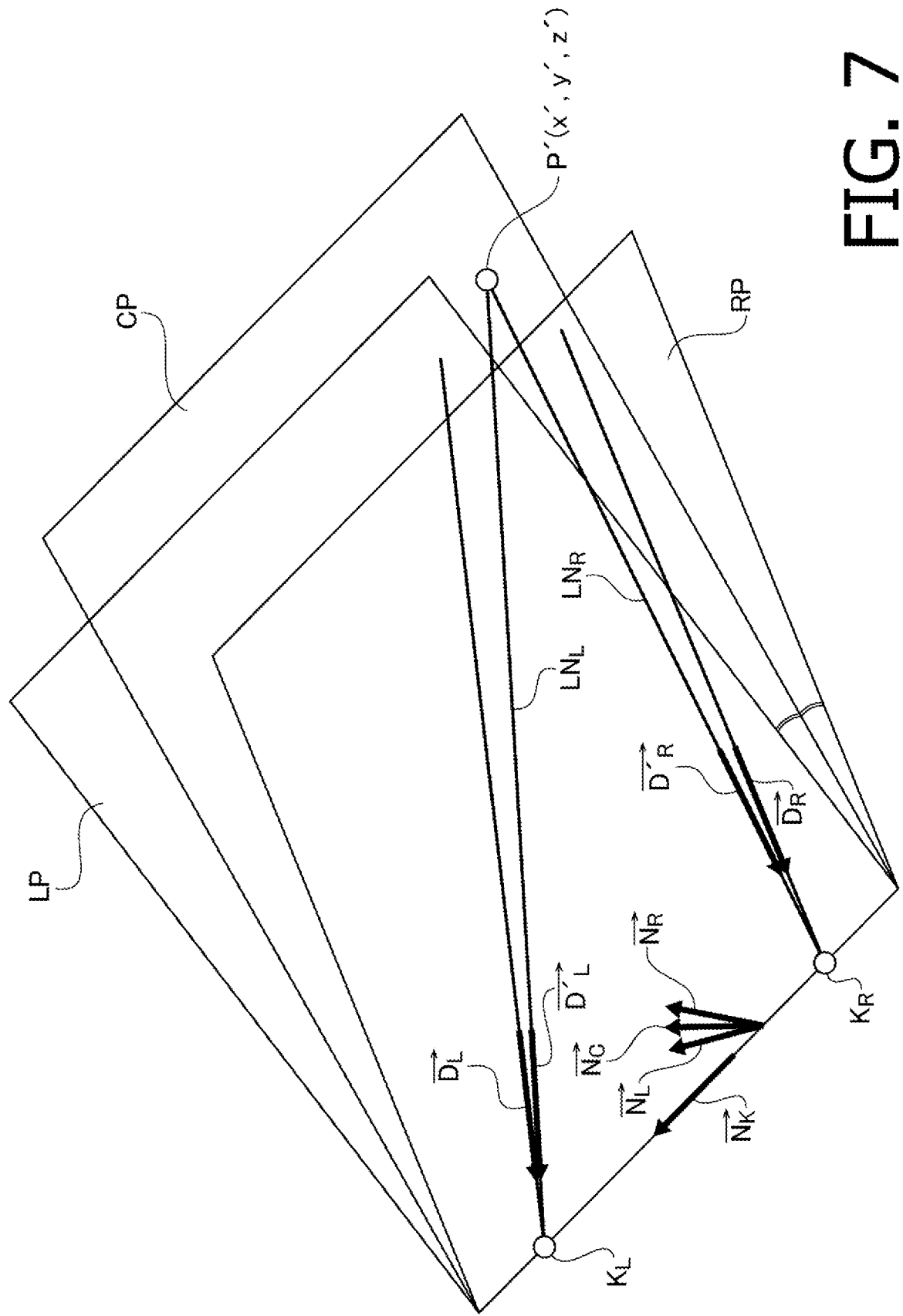
FIG. 7 shows an example of a method for calculating an apparent position according to the embodiment.

In S105, the controller 100 calculates an apparent point P', which is the apparent position of the evaluation point P in the virtual space. In FIGS. 6 and 7, an example of a calculation method is illustrated. FIG. 6 shows an enlarged view of the eyeball models $E_L$ and $E_R$ shown in FIG. 3. In FIG. 6, lenses (crystalline lenses), which are omitted in FIG. 3, are also illustrated. FIG. 7 conceptually illustrates an example of a method for calculating the apparent point P'.

With both eyes fixated on the fixation point FP, the principal rays from the evaluation point P pass through the pupils of the right and left eyes and reach the peripheral positions of the respective retinas. The direction vector of the corneal incident ray of the principal ray of the right eye is marked with a sign $D_R$, the corneal transit point is marked with a sign $K_R$, and the retinal arrival point is marked with a sign $M_R$. Further, the direction vector of the corneal incident ray of the principal ray of the left eye is marked with a sign $D_L$, the corneal transit point is marked with a sign $K_L$, and the retinal arrival point is marked with a sign $M_L$. The difference in position between the retinal arrival point $M_L$ and the retinal arrival point $M_R$ generates a disparity that allows a person to discriminate a three-dimensional position in space. One method of calculating the apparent position from disparity is to calculate the point P' where the extensions of the incident principal rays of the left and right eyes intersect, and use this point as the apparent position P' of the evaluation point P.

The optical performance of the eyeball model E is known. Thus, the controller 100 can calculate the direction vectors of each ray incident on the cornea and the passing point on the cornea. Concretely, the controller 100 reversely traces rays of light from the retinal arrival points M (left and right pairs of retinal arrival points $M_L$ and $M_R$) through the pupil centers, calculates the positions on the cornea when the reversely traced rays pass through the cornea (left and right pairs of corneal transit points $K_L$ and $K_R$), and calculates the incident directions when these rays enter the cornea (direction vectors $D_L$ and $D_R$ for the left and right pairs of corneal incident rays). For the sake of convenience, a straight line extending in the direction of the direction vector $D_L$ may be described in this description with the same sign $D_L$. In addition, a straight line extending in the direction of the direction vector $D_R$ may also be described with the same sign $D_R$. In FIGS. 6 and 7, the vectors are denoted with arrows, but for convenience, arrows are omitted in this description except in the formulas.

The intersection of the straight line $D_L$ and the straight line $D_R$ extending in the directions of the direction vectors of the left and right pairs of corneal incident rays is the apparent point P'(x', y', z') of the evaluation point P(x, y, z). In the case of the naked eyes, the two lines $D_L$ and $D_R$ intersect because the corneal incident rays are not refracted by the eyeglasses lenses. In contrast, when wearing eyeglasses lenses, both lines $D_L$ and $D_R$ do not necessarily intersect because the corneal incident rays are refracted by the eyeglasses lenses. When the corneal incident rays do not intersect, the plane LP and the plane RP form an angle, as shown in FIG. 7. The plane LP is a plane including both a straight line connecting the corneal passing points $K_L$ and $K_R$, and the straight line $D_L$. The plane RP is a plane including both the straight line connecting the corneal passing points $K_L$ and $K_R$, and the straight line $D_R$.

As one method of obtaining the apparent point P', the controller 100 projects the straight lines $D_L$ and $D_R$ onto a plane CP that bisects an angle between the plane LP and the plane RP, and obtains the point on the plane CP where these projected lines intersect as the apparent point P'(x', y', z').

The concrete method of obtaining the apparent point P'(x', y', z') is explained below. First, assume that $N_K$ is a unit vector from the corneal passing point $K_R$ to the corneal passing point $K_L$. A unit normal vector NL of the plane LP, a unit normal vector $N_R$ of the plane RP, and a unit normal vector $N_C$ of the plane CP are respectively expressed by the following equations, respectively.

$$\vec{N_L} = \frac{\vec{N_K} \times \vec{D_L}}{|\vec{N_K} \times \vec{D_L}|}$$

$$\vec{N_R} = \frac{\vec{N_K} \times \vec{D_R}}{|\vec{N_K} \times \vec{D_R}|}$$

$$\vec{N_C} = \frac{\vec{N_L} + \vec{N_R}}{|\vec{N_L} + \vec{N_R}|}$$

The unit vector $D'_L$ of the line $D_L$ projected onto the plane CP and the unit vector $D'_R$ of the straight line $D_R$ projected onto the plane CP are expressed by the following equations, respectively.

$$\vec{D'_L} = \frac{\vec{D_L} - (\vec{D_L} \cdot \vec{N_C})\vec{N_C}}{|\vec{D_L} - (\vec{D_L} \cdot \vec{N_C})\vec{N_C}|}$$

$$\vec{D'_R} = \frac{\vec{D_R} - (\vec{D_R} \cdot \vec{N_C})\vec{N_C}}{|\vec{D_R} - (\vec{D_R} \cdot \vec{N_C})\vec{N_C}|}$$

The controller 100 obtains the apparent point P'(x', y', z') by finding a straight line $LN_L$ extending in the direction of the unit vector $D'_L$ and a straight line $LN_R$ extending in the direction of the unit vector $D'_R$ and analyzing a triangle $P'K_LK_R$ on the plane CP based on the sine theorem.

The controller 100 obtains the apparent points P' for all the evaluation points P. In the present embodiment, similar to the way that the plane OP is represented by a plurality of evaluation points P, the apparent plane AP is represented by a plurality of apparent points P' (all the apparent points P' obtained here).

Thus, in S105, the controller 100 calculates a set of the plurality of apparent points P'.

In S106, the controller 100 calculates a difference between the position of the apparent point P' and the reference position of the evaluation point P corresponding to the apparent point P'. In the present embodiment, the controller 100 calculates a difference between an apparent position of the evaluation point P when it is viewed while the wearer wears a pair of left and right eyeglasses lenses (i.e., the position of the apparent point P') and the reference position $P_0$ of the evaluation point P.

In the present embodiment, the difference between the apparent point P' and the reference position $P_0$ is calculated by dividing the difference between the apparent point P' and the reference position $P_0$ into a difference $\Delta A$ in viewing direction and a difference $\Delta D$ in depth (an inverse of the distance from the midpoint O of both eyes). The difference in viewing direction is defined as the absolute value of the sine of the angle $\alpha$ between the direction vector of the straight line P'O from the apparent point P' to the midpoint O of both eyes at each evaluation point P and the direction vector of the straight line $P_0$O from the reference position $P_0$ to the midpoint O of both eyes at each evaluation point P.

$$(\Delta A(x, y, z))^2 = \sin^2 \alpha =$$

$$1 - \cos^2 \alpha = 1 - \left(\frac{\vec{P_0 O}}{|P_0 O|} \cdot \frac{\vec{P'O}}{|P'O|}\right)^2 = 1 - \frac{(x_0 x' + y_0 y' + z_0 z')^2}{(x_0^2 + y_0^2 + z_0^2)(x'^2 + y'^2 + z'^2)}$$

The depth is the inverse of the distance from the midpoint O of both eyes. The difference in depth, $\Delta D$, is indicated by the following equation.

$$\Delta D(x, y, z) = \frac{1}{|P'O|} - \frac{1}{|P_0 O|} = \frac{1}{\sqrt{x'^2 + y'^2 + z'^2}} - \frac{1}{\sqrt{x_0^2 + y_0^2 + z_0^2}}$$

In S107, the controller 100 calculates the evaluation index DI by taking statistics of the difference between the reference position $P_0$ of each evaluation point P set in the evaluation target space and its apparent position P'. Concretely, the controller 100 calculates the evaluation index DI based on an equation (1) below.

$$DI = \sqrt{\frac{1}{n}\sum_{i=1}^{n} \Delta_i^2} \qquad \text{Equation (1)}$$

where, n is the number of samples of the evaluation points set in the space, and $\Delta_i$ is a difference between the apparent position P' of each evaluation point P and the reference position $P_0$.

The evaluation index DI may be indicated by one or both of an evaluation index DIA and an evaluation index DID indicated by the equations below. The evaluation index DIA is the difference $\Delta_i$ expressed as the difference $\Delta A_i$ in the viewing direction, and the evaluation index DID is the difference $\Delta_i$ expressed as the difference $\Delta D_i$ in depth.

$$DIA = \sqrt{\frac{1}{n}\sum_{i=1}^{n} \Delta A_i^2}$$

$$DID = \sqrt{\frac{1}{n}\sum_{i=1}^{n} \Delta D_i^2}$$

where, DIA is an evaluation index based on a difference in the viewing direction, DID is an evaluation index based on a difference in the depths, $\Delta A_i$ is $|\sin \alpha_i|$ for each evaluation point P, and $\Delta D_i$ is a difference between $D_i$ and $D_{i0}$ (i.e., $D_i - D_{i0}$), $D_i$ being an inverse of the distance from the apparent position P' to the midpoint O of both eyes, $D_{i0}$ being an inverse of the distance from the reference position $P_0$ to the midpoint O of both eyes.

The coordinate system of the virtual space is not necessarily limited to the XYZ orthogonal coordinate system, but may instead be a coordinate system defined by azimuth angle and depth. In such a case, the position of each evaluation point P is represented by P(D, T, C), for example. It is noted that D is the depth of the evaluation point P (depth being the inverse of the distance from the midpoint O of both eyes), T is the tangent of the longitudinal azimuthal angle, and C is the tangent of the transverse azimuthal angle. The depth D, the longitudinal azimuth angle T, and the transverse azimuth angle C are respectively indicated by the following equations.

$$D = \frac{1}{\sqrt{x^2 + y^2 + z^2}}$$
$$T = \frac{y}{x}$$
$$C = \frac{z}{x}$$

When the longitudinal azimuth angle T and the transverse azimuth angle C are converted to polar coordinates, the tangent of the radial azimuth angle is $\rho$, and the quadrant azimuth angle is $\theta$, $\rho$ and $\theta$ are expressed by the following equations.

$$\rho = \sqrt{T^2 + C^2}$$
$$\theta = \tan^{-1}\left(\frac{C}{T}\right) = \tan^{-1}\left(\frac{z}{y}\right)$$

The evaluation point P can be denoted by any of P(x, y, z), P(D, T, C), or P(D, $\rho$, $\theta$). That is, the point sequence of the evaluation points P can be sampled with equal or unequal intervals in each axis in the xyz coordinate system, for example, and can also be sampled with equal or unequal intervals in each axis in the D-T-C coordinate system, or with equal or unequal intervals in each axis in the D-$\rho$-$\theta$ coordinate system.

In the above equation (1), when n is the number of samples of evaluation points P aligned in the space in front of the eyeglasses lenses and $\Delta D_i$ is the difference in the position of each evaluation point P aligned in this space $\Delta D$ (x, y, z), then the evaluation index DI is the evaluation result of an evaluation of the appearance of the forward space through the eyeglasses lenses.

If the forward space which is the evaluation area is a rectangular space, the above equation (1) can be replaced by the more concrete equation indicated below.

$$DIA = \sqrt{\frac{1}{n_x n_y n_z} \sum_{i=1}^{n_x} \sum_{j=1}^{n_y} \sum_{k=1}^{n_z} \Delta A_{ijk}^2}$$

$$DID = \sqrt{\frac{1}{n_x n_y n_z} \sum_{i=1}^{n_x} \sum_{j=1}^{n_y} \sum_{k=1}^{n_z} \Delta D_{ijk}^2}$$

where;
$n_x$ is the number of samples of evaluation points P aligned in the X-axis direction in the forward space;
$n_y$ is the number of samples of evaluation points P aligned in the Y-axis direction in the forward space;
$n_z$ is the number of samples of evaluation points P aligned in the Z-axis direction in the forward space;
$\Delta A_{ijk}$ is the difference $\Delta A$ (x, y, z), in a viewing direction, of each evaluation point P set in the forward space; and
$\Delta D_{ijk}$ is the difference $\Delta D$ (x, y, z), in depth, for each evaluation point P in the forward space.

Further, in each direction, the evaluation points P are equally or unequally spaced.

If the forward space, which is the evaluation area, is a space of a quadrangular pyramid or conical with the midpoint O of both eyes as a vertex, the above equation (1) can be replaced with the more concrete equation below.

$$DIA = \sqrt{\frac{1}{n_D n_T n_C} \sum_{i=1}^{n_D} \sum_{j=1}^{n_T} \sum_{k=1}^{n_C} \Delta A_{ijk}^2}$$

$$DID = \sqrt{\frac{1}{n_D n_T n_C} \sum_{i=1}^{n_x} \sum_{j=1}^{n_y} \sum_{k=1}^{n_z} \Delta D_{ijk}^2}$$

where;
$n_D$ is the number of samples of evaluation points P aligned in the direction of depth in the forward space;
$n_T$ is the number of samples of evaluation points P aligned in the direction of longitudinal azimuth angle in the forward space;
$n_C$ is the number of samples of evaluation points P aligned in the direction of transverse azimuth angle in the forward space;
$\Delta A_{ijk}$ is the difference $\Delta A$ (D, T, C), in a viewing direction, of each evaluation point P set in the forward space; and
$\Delta D_{ijk}$ is the difference $\Delta D$ (D, T, C), in depth, for each evaluation point P in the forward space.

Further, in each direction, the evaluation points P are equally or unequally spaced.

If the forward space, which is the evaluation area, is the conical space with the midpoint O of both eyes as the vertex, the above equation (1) can be replaced by a more concrete equation as follows.

$$DIA = \sqrt{\frac{1}{n_D n_\rho n_\theta} \sum_{i=1}^{n_D} \sum_{j=1}^{n_\rho} \sum_{k=1}^{n_\theta} \Delta A_{ijk}^2}$$

$$DID = \sqrt{\frac{1}{n_D n_\rho n_\theta} \sum_{i=1}^{n_D} \sum_{j=1}^{n_\rho} \sum_{k=1}^{n_\theta} \Delta D_{ijk}^2}$$

where:
$n_\rho$ is the number of samples of evaluation points P aligned in the direction of radial azimuth angle in the forward space;
$n_\theta$ is the number of samples of evaluation points P aligned in the direction of quadrant azimuth angle in the forward space;
$\Delta A_{ijk}$ is the difference $\Delta A$(D, $\rho$, $\theta$), in a viewing direction, for each evaluation point P set in the forward space; and
$\Delta D_{ijk}$ is the difference $\Delta D$(D, $\rho$, $\theta$), in depth, for each evaluation points P in the forward space.

Further, in each direction, the evaluation points P are equally or unequally spaced.

The evaluation index may be calculated by taking statistics of all the evaluation points P located in the forward space, or the evaluation index may be calculated for some of the evaluation points P located in the forward space.

The evaluation index DI (or evaluation indices DIA and DID) is an index that quantifies the change in the visual field when the wearer wears the eyeglasses lenses relative to the reference state. The larger the value of the evaluation index DI, the greater the change in the visual field relative to the reference state. With the set fixation point FP being viewed fixedly through the line of sight passing position FP' on the eyeglasses lenses, the evaluation index DI (or evaluation indices DIA and DID) is an index that includes, as a target of evaluation, the deviation of the surrounding evaluation points P from the reference positions $P_0$. That is, the evaluation index DI represents the evaluation content that takes into account images captured not only in the central fovea but also in the retinal periphery outside the central fovea. Therefore, for example, for a patient who is likely to feel uncomfortable with image distortion or the like captured in the retinal periphery outside the central fovea (in other words, image distortion or the like in the periphery of the visual field), it is possible to provide eyeglasses lenses that satisfy the patient by, for example, suggesting eyeglasses lenses with smaller values of the evaluation index DI (or the evaluation indices DIA, DID).

Two concrete embodiments are described below. In embodiment 1, the evaluation area is the forward space of the eyeglasses lenses, and in embodiment 2, the evaluation area is a plane a specific distance away from the midpoint O of both eyes. In either of the embodiment 1 or 2, the targets of evaluation are progressive power lenses for bifocal use, and the reference state is the naked eye state.

The bifocal progressive power lenses to be evaluated are common between the embodiments 1 and 2. The descriptions of these bifocal progressive power lenses are as follows.

Right lens: S0.00D, ADD2.50D, Progressive belt length 11 mm
Left lens: S0.00D, ADD2.50D, Progressive belt length 11 mm
Far PD: 64 mm
Front tilt angle: 0.0 degree
Internal tilt angle: 0.0 degree
CVD: 14.5 mm It is noted that the CVD (Corneal Vertex Distance) is the distance between the back vertex of the eyeglasses lens and the front surface of the cornea (corneal vertex).

Embodiment 1

In embodiment 1, a conical space (for convenience, it will be referred to as "conical space CS") with a radius angle of 50.2 degrees with its vertex at the midpoint O of both eyes is the evaluation area. The depth range of the conical space CS is from 0D to 3.5D (in other words, from infinite distance to 286 mm). The position on the eyeglasses lenses through which the line of sight to the fixation point FP, set at infinite distance, passes is 4 mm above the geometric center of the eyeglasses lens. When the entire conical space CS is considered as the evaluation area, the evaluation areas on the eyeglass lenses (in other words, the area on the eyeglass lenses through which the line of sight to each evaluation point P located in the entire conical space CS) are areas of approximately φ40 mm centered at the geometric centers, respectively. For convenience of explanation, the evaluation area on the eyeglass lens is referred to as "lens evaluation area EA."

Figure 8:
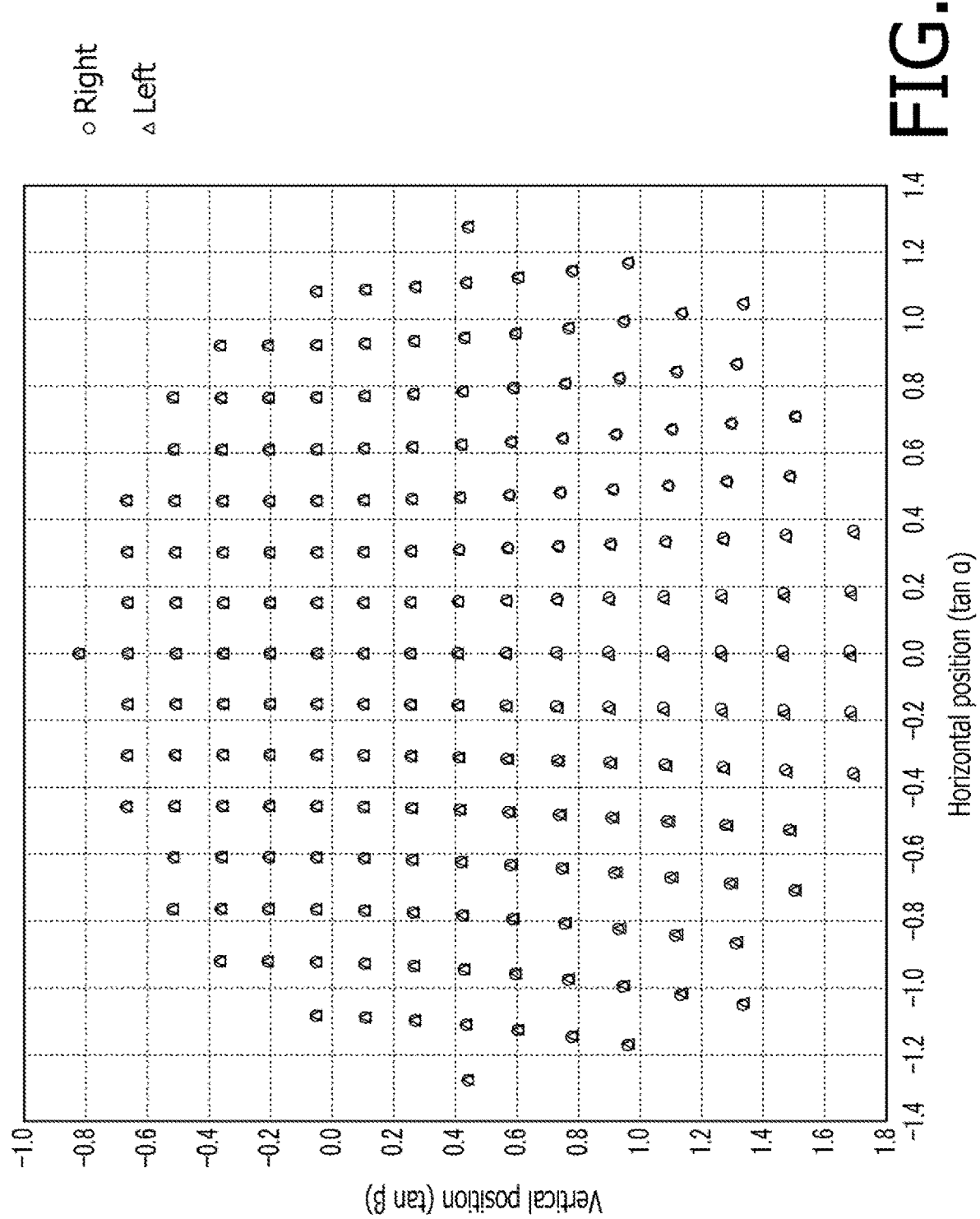
FIG. 8 shows a parallax between the right and left eyes when a wearer is looking at a spherical plane in an evaluation area located at infinite distance) while wearing the eyeglasses lenses in accordance with a first embodiment.
Figure 9:
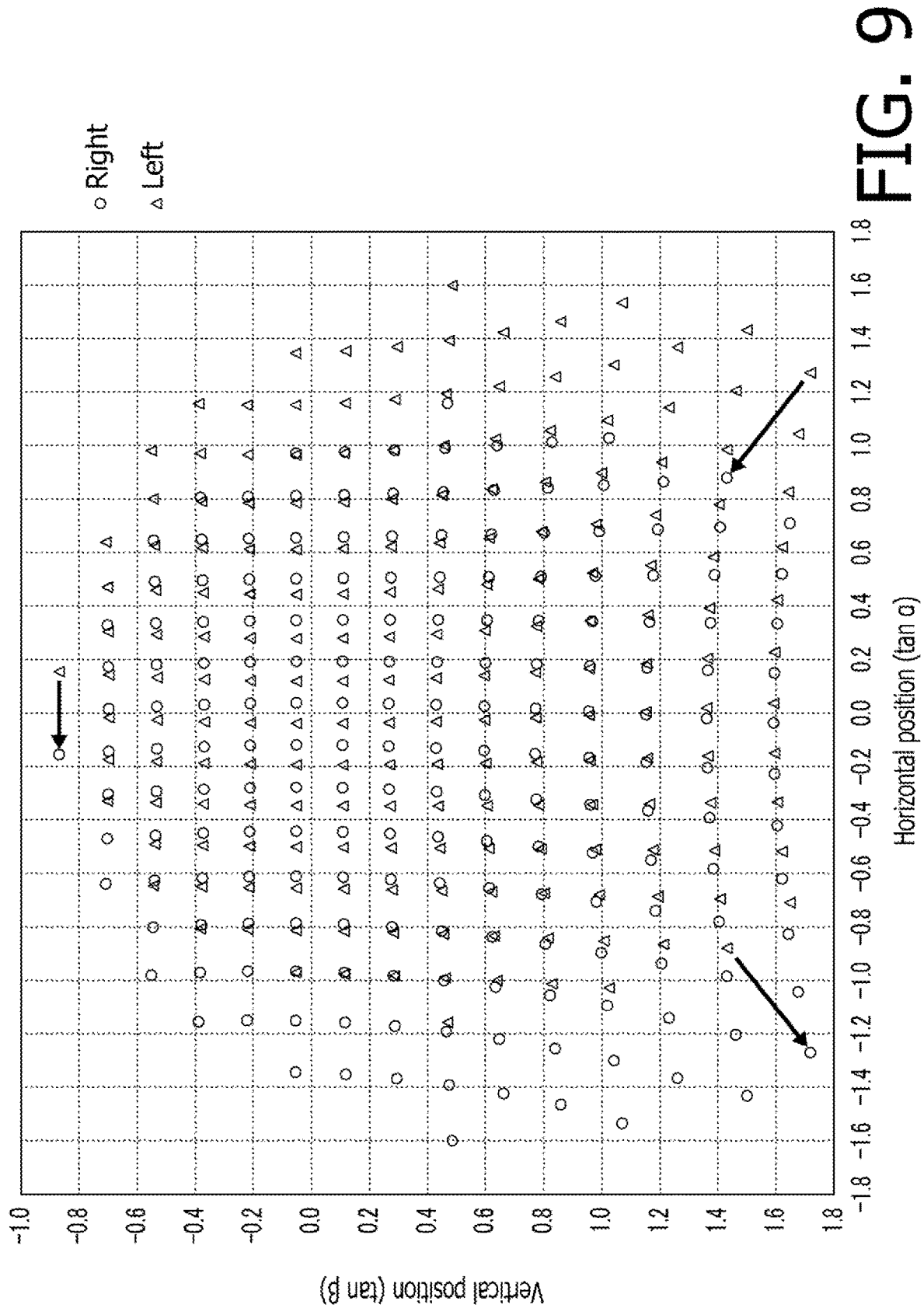
FIG. 9 shows the parallax between the right and left eyes when the wearer is looking at a spherical plane in the evaluation area at a distance of 286 mm while wearing the eyeglasses lenses in accordance with the first embodiment.

FIG. 8 shows the disparity between the left and right eyes when the wearer wears the eyeglasses lenses (bifocal progressive power lenses) according to the embodiment 1, and when the depth is 0D (in other words, the disparity between the left and right eyes when looking from the midpoint O of both eyes to the plane OP at infinite distance). FIG. 9 shows the disparity between the left and right eyes when the wearer wears the eyeglasses lenses according to embodiment 1 at a depth of 3.5D (in other words, the disparity between the left and right eyes when looking at a plane OP 286 mm away from the midpoint O of both eyes). In each of FIGS. 8 and 9, the circles indicate the positions of the evaluation points P when viewed with the right eye, and the triangles indicate the positions of the evaluation points P when viewed with the left eye. The greater the distance between the two positions (i.e., the positions of the evaluation points P viewed with right and left eyes), the greater the disparity. In each of FIGS. 8 and 9, the vertical axis indicates the vertical position in the conical space CS, and the horizontal axis indicates the horizontal position in the conical space CS. In each of FIGS. 8 and 9, the positions of the evaluation points P in the vertical direction (T=tan α) and the positions of the evaluation points P in the horizontal direction (C=tan β) are indicated by tangent values, respectively.

In each of the depth, longitudinal azimuth and transverse azimuth directions, the evaluation points P are equally spaced. The evaluation points P are located at intervals of 0.5D (ΔD=0.5) for the depth direction, and at intervals of 0.15 (ΔT=0.15, ΔC=0.15) for the longitudinal and transverse azimuthal direction. The total number of evaluation points P set within the conical space CS is 1548.

In FIG. 8, the circles representing the right eye retinal position and the triangles representing the left eye retinal position at each evaluation point P almost overlap (i.e., located in the same position) in the upper half of the lens, and the disparity is close to zero. There is some parallax in the lower half of the lens. In FIG. 9, the object distance is close to 286 mm, so the magnitude of the parallax is relatively different at each evaluation point P. Furthermore, the parallax is slightly larger in the lower half of the lens than in the upper half of the lens.

For the convenience of indicating that the disparity when the wearer wears eyeglasses lenses is particularly large at the periphery of the visual field, arrow marks are added for the three evaluation points P in FIG. 9. The arrow marks indicate arrows directed from the positions as seen by the left eye to the positions as seen by the right eye.

With the use of the disparity information shown in FIGS. 8 and 9, it is possible to calculate the apparent positions P' of respective evaluation points P as described above and process statistics the depth difference ΔD and the viewing direction difference ΔA in the designated range (space to be evaluated). When the entire conical space CS is regarded as the evaluation area, the number of evaluation points is 1548, the evaluation index DID based on the depth difference is 0.0857, and the evaluation index DIA based on the viewing difference is 0.0326. When a space in which evaluation points P (tonal number being 600) at the end of each line of sight passing through an upper half of the lens evaluation area EA (for convenience, referred to as "lens evaluation area $EA_U$") in the conical space CS is regarded as evaluation area, the evaluation index DID is 0.0586 and the evaluation index DIA is 0.0097. When a space in which evaluation points P (tonal number being 948) at the end of each line of sight passing through a lower half of the lens evaluation area EA (for convenience, referred to as "lens evaluation area $EA_D$") in the conical space CS is regarded as the evaluation area, the evaluation index DID is 0.0991 and the evaluation index DIA is 0.0409.

When only the evaluation points P of which depth is OD (infinite distant object) in the conical space CS are regarded as the evaluation area (total number of evaluation points P being 192), the evaluation index DID is 0.0393, and the evaluation index DIA is 0.0322. When an area in which the evaluation points P of which depth is OD (total number being 75) at the end of each line of sight passing through the lens evaluation area $EA_U$ is regarded as the evaluation area, the evaluation index DID is 0.0052 and the evaluation index DIA is 0.0097. When an area in which the evaluation points P of which depth is OD (total number being 117) at the end of each line of sight passing through the lens evaluation area $EA_D$ is regarded as the evaluation area, the evaluation index DID is 0.0501 and the evaluation index DIA is 0.0405.

When only the evaluation points P of which depth is 3.5D (286 mm) in the conical space CS are regarded as the evaluation area (total number of evaluation points P being 196), the evaluation index DID is 0.1385 and the evaluation index DIA is 0.0335. When an area in which the evaluation points P of which depth is 3.5D (total number being 75) at the end of each line of sight passing through the lens evaluation area $EA_U$ is regarded as the evaluation area, the evaluation index DID is 0.0970 and the evaluation index DIA is 0.0099. When an area in which the evaluation points P of which depth is 3.5D (total number being 121) at the end of each line of sight passing through the lens evaluation area $EA_D$ is regarded as the evaluation area, the evaluation index DID is 0.1588 and the evaluation index DIA is 0.0419.

From the evaluation index DID calculated in embodiment 1, it is found that for progressive power lenses for bifocal use, the closer the object distance is, the greater the difference between the apparent position and the reference position tends to be in the situation where the wearer is looking fixedly at infinite distance (almost in front of the lens). Furthermore, when viewed through the lens evaluation area $EA_D$ (in other words, the near use portion rather than the far use portion) than through the lens evaluation area $EA_U$, it is found that the difference between the depth of the apparent position and the reference position tends to be larger. On the other hand, from the evaluation index DIA calculated in embodiment 1, regardless of the depth of the evaluation point, it is found the difference between the viewing direction of the apparent position and the reference position tends to be larger when viewed through the lens evaluation area $EA_D$ than through the lens evaluation area $EA_U$ (in other words, the near use portion rather than the far use portion).

Embodiment 2

In embodiment 2, a situation in which a newspaper is unfolded and the wearer watches it through the near use portion of a bifocal progressive power lens (FIG. 10) is evaluated. The fixation point FP is 40 cm away from the midpoint O of both eyes. Because it is viewed through the near use portion (concretely, 11 mm below the geometric center of the lens), the fixation point FP is slightly oblique downward from the eyes. The plane OP perpendicular to the straight line from the midpoint O of both eyes to the fixation point FP is set as the paper surface (plane) of the newspaper, and the evaluation points P are set on this plane. Concretely, a rectangular plane with a horizontal dimension of 80 cm and a vertical dimension of 40 cm is the evaluation area. The evaluation points P are arranged at 0.1 intervals ($\Delta T=0.1$, $\Delta C=0.1$). For convenience, FIG. 10 illustrates the eyeball model centered at the midpoint O of both eyes.

FIG. 11 is a similar drawing to FIGS. 8 and 9, and shows the disparity between the left and right eyes when the wearer wears the spectacle lenses (bifocal progressive power lenses) of embodiment 2 and viewing a plane OP positioned obliquely downwards. In embodiment 2, when the entire plane OP is considered as the evaluation area, the evaluation index DID is 0.1165, and the evaluation index DIA is 0.0350. The same arrow marks as in FIG. 9 are also marked in FIG. 11.

Referring to FIG. 11, it can be seen that with the bifocal progressive power lenses of embodiment 2, in a situation where the wearer is looking obliquely downward at close range (for example, when the wearer is reading a newspaper or book, or when the wearer is looking at the screen of a PC or tablet device), the disparity between the left and right eyes relative to the naked eyes state increases at the periphery of the visual field, away from the fixation point FP. Based on the evaluation indices DID and DIA, the eyeglasses lenses provider can propose eyeglasses lenses with less image distortion in the periphery of the visual field, for example, for patients who are easily discomforted by image distortion in the periphery of the visual field in situations where they are looking diagonally downwards at close range.

The above is a description of the present embodiments according to the present disclosures. The embodiments are not necessarily limited to those described above, but various variations are possible within aspects of the technical concept of the present disclosures. For example, the embodiments, or the like, which are explicitly indicated by way of examples in the description, or combinations of the obvious embodiments, as appropriate, are also included in the embodiments of the present application.

What is claimed is:

1. An eyeglasses lens evaluation device, comprising:
a controller configured to:
set a pair of right and left eyeball models and a pair of right and left eyeglasses lenses models in a virtual space, the pair of right and left eyeball models representing a pair of right and left eyeballs of a wearer, the pair of right and left eyeglasses lenses models representing a pair of right and left eyeglasses lenses;
set a particular position on an evaluation target space as a fixation point in the virtual space;
set a virtual optical model, in the virtual space, representing a condition where the wearer wears a pair of right and left eyeglasses lenses and is looking at the fixation point and fixes wearer's eyes based on the pair of right and left eyeball models and the pair of right and left eyeglasses lenses models;
set a line of sight passing position, of the wearer, on each of the pair of right and left eyeglasses lenses, respectively, in the virtual optical model;
set a plurality of evaluation positions on the evaluation target space as a plurality of evaluation points;
calculate an apparent position of each of the plurality of evaluation points set on the evaluation target space in a virtual state where the wearer wears the pair of right and left eyeglasses lenses and fixates the wearer's eyes on the fixation point via the line of sight passing positions;
calculate, for each of the plurality of evaluation points, a difference between the calculated apparent position of each of the plurality of evaluation points and a reference position of each of the plurality of evaluation points; and calculate an evaluation index by taking statics of the calculated difference for each of the plurality of evaluation points, wherein the particular position of the fixation point is different from the plurality of positions set on the evaluation target space as the plurality of evaluation points.

2. The eyeglasses lens evaluation device according to claim 1, wherein the controller is further configured to calculate the evaluation index using a following equation:

$$DI = \sqrt{\frac{1}{n}\sum_{i=1}^{n} \Delta D_i^2}$$

where, DI is the evaluation index, n is a number of samples of the plurality of evaluation points set in the evaluation target space, and $\Delta_i$ is the difference between the apparent position and the reference position of each of the plurality of evaluation points.

3. The eyeglasses lens evaluation device according to claim 2, wherein the difference between the apparent position and the reference position of each of the plurality of evaluation points is calculated according to a following equation:

$$\Delta_i = D_i - D_{i0}$$

where, $D_i$ is an inverse of a distance from the apparent position of each of the plurality of evaluation points to a midpoint of both eyes of the wearer, and $D_{i0}$ is an inverse of a distance from the reference position of each of the plurality of evaluation points to the midpoint of both eyes of the wearer.

4. The eyeglasses lens evaluation device according to claim 2, wherein the difference between the apparent position and the reference position of each of the plurality of evaluation point is calculated according to a following equation:

$$\Delta_i = |\sin \alpha_i|$$

where, $\alpha$ is an angle between a vector from the apparent point to a midpoint of both eyes of the wearer at each of the plurality of evaluation points and a vector from the reference position to the midpoint of both eyes of the wearer at each of the plurality of evaluation points.

5. The eyeglasses lens evaluation device according to claim 1, wherein the reference position is a position of each of the plurality of evaluation points set on the evaluation target space.

6. The eyeglasses lens evaluation device according to claim 1, wherein the pair of right and left eyeglasses lenses are lenses other than single focus lenses, and wherein the reference position is an apparent position when the wearer wears the single focus lenses which have the same power as the pair of right and left eyeglasses lenses.

7. The eyeglasses lens evaluation device according to claim 1, wherein calculating the apparent position of each of the plurality of evaluation points includes maintaining fixed lines of sight through the line of sight passing positions and to the fixation point while calculating the apparent positions of each of the evaluation points.

* * * * *